(12) United States Patent
Matsui et al.

(10) Patent No.: US 6,989,961 B2
(45) Date of Patent: Jan. 24, 2006

(54) MAGNETIC HEAD WITH MEDIUM SLIDING SURFACE HAVING VARIED CURVATURE AND RECORDING/REPRODUCING APPARATUS

(75) Inventors: Kazuhiko Matsui, Niigata-ken (JP); Akihiro Sato, Niigata-ken (JP); Kyoichi Kawase, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 342 days.

(21) Appl. No.: 10/601,169

(22) Filed: Jun. 20, 2003

(65) Prior Publication Data

US 2004/0085672 A1 May 6, 2004

(30) Foreign Application Priority Data

Jun. 21, 2002 (JP) .................................... 2002-181767

(51) Int. Cl.
 *G11B 5/187* (2006.01)

(52) U.S. Cl. ..................................................... 360/122
(58) Field of Classification Search ................ 360/122, 360/130.21–130.23
 See application file for complete search history.

(56) References Cited

U.S. PATENT DOCUMENTS 6,271,990 B2 8/2001 Kikuiri 6,590,741 B1 * 7/2003 Hasegawa et al. .......... 360/122

FOREIGN PATENT DOCUMENTS

JP 62-18812 2/1987
JP 4-289509 10/1992

* cited by examiner

*Primary Examiner*—A. J. Heinz
(74) *Attorney, Agent, or Firm*—Brinks Hofer Gilson & Lione

(57) ABSTRACT

A magnetic head includes core blocks having a medium sliding surface formed on one surface of the core blocks, the medium sliding surface having a slender convex curved shape formed along a sliding direction of a recording medium from the upstream side of the sliding direction to the downstream side, and the medium sliding surface having a magnetic gap formed thereon, wherein the medium sliding surface is shaped along a longitudinal direction thereof like a circular arc with a radius of curvature R while being shaped along a width direction like a circular arc with a radius of curvature r, which is smaller than the radius of curvature R, so that the radius of curvature r is continuously reduced with closer distance to the downstream end of the recording medium sliding direction from a vicinity of the magnetic gap, so that by employing the above magnetic head, a long life magnetic head with small damage due to foreign material adhesion as well as small abrasion can be provided.

12 Claims, 12 Drawing Sheets

MAGNETIC HEAD WITH MEDIUM SLIDING SURFACE HAVING VARIED CURVATURE AND RECORDING/REPRODUCING APPARATUS

BACKGROUND OF THE INVENTION

1. Field of the Invention

The present invention relates to magnetic heads, and in particular relates to a magnetic head for use in VTR equipment and a tape storage device such as a DDS (digital data storage, digital tape streamer).

2. Description of the Related Art

In a magnetic head for use in VTR equipment, the track width has been decreased year after year in consistency with the recording density improvement and the digitizing a signal recording pattern.

From such a background, an MIG (metal in gap) type magnetic head has been used, in which a pair of magnetic core half-pieces, which are made of ferrite or ceramic so as to have metallic magnetic thin films formed thereon and being excellent in soft magnetic characteristics, are integrated together with an insulating film therebetween by a bonding member such as deposited glass.

Recently, in order to reduce the track width further than that of the MIG type magnetic head, a thin-film magnetic head having a thin-film coil is tried to incorporate it into a magnetic head for VTR equipment.

FIG. 13 shows a perspective view of a thin-film magnetic head 200 as an example of a magnetic head. The thin-film magnetic head 200 is built by bonding side faces of plate-like core half-pieces 202 and 203 together with a core-embedded layer 205 therebetween so as to have a plate-like integrated structure on the whole. The core half-pieces 202 and 203 are made of a hardwearing ceramic material such as $CaTiO_3$ and AlTiC ($Al_2O_3$—$TiO_2$ ceramic), or Ni—Zn ferrite.

As shown in FIG. 13, one surface of the thin-film magnetic head 200 is also shaped like a slender convex curved surface so as to have a medium sliding surface 210, and on both sides of the medium sliding surface 210 in the width direction, steps 212 and 213 are continuously formed so as to sandwich the medium sliding surface 210. That is, in an upper portion of the half-pieces 202 and 203, a projection 215 cramped by the steps 212 and 213 is constructed, and the top surface of the projection 215 constitutes the medium sliding surface 210 while surfaces neighboring both the side surfaces of the medium sliding surface 210 in the width direction constitute side faces 207 and 207.

A medium sliding surface 210 is to be a curved surface (a curved surface along a sliding direction of a recording medium) along a circular arc with a radius of curvature R on a surface including large side surfaces 202a and 203a of the core half-pieces 202 and 203 and furthermore, the medium sliding surface 210 is to be a curved surface along a circular arc with a radius of curvature r existing on a side face 202b (a surface perpendicularly neighboring on the side surface 202a) of the core half-piece 202.

The radius of curvature r is set to be smaller than the radius of curvature R, and is also set to be substantially constant along a longitudinal direction of the medium sliding surface 210. For example, if in the core half-pieces 202 and 203, the width is 1.0 mm, the height is 1.8 mm, the depth is 0.28 mm, and the with of the medium sliding surface 210 is between from 150 to 200 μm, the radius of curvature R can be between from 3 to 5 mm, and the radius of curvature r can be between from 1 to 2 mm.

The core-embedded layer 205 arranged at the center of the medium sliding surface 210 is provided with a magnetic head 211 built therein, and at the substantial center of the medium sliding surface 210, a magnetic gap G of the magnetic head 211 is exposed.

In the thin-film magnetic head 200 mentioned above, the radius of curvature r is set to be substantially constant along a longitudinal direction of the medium sliding surface 210, so that the width of an actual contact part with a recording medium of the medium sliding surface 210 is substantially constant along a longitudinal direction (a sliding direction of a recording medium) of the medium sliding surface 210.

Therefore, during the traveling of a medium, a foreign material, for example, adhering to a tape-shaped recording medium is readily caught up between the medium sliding surface 210 and the recording medium, possibly resulting in damage of the medium sliding surface 210 due to the foreign material.

In order to prevent the damage of the medium sliding surface 210, the contact part with a recording medium of the medium sliding surface 210 may be reduced by tapering the medium sliding surface 210 with the radius of curvature r reduced to be as small as possible; however, in this case, there is a problem that the contact pressure of the recording medium is concentrated on an edge extremity of the medium sliding surface 210 so that the abrasion of the medium sliding surface 210 is increased.

SUMMARY OF THE INVENTION

The present invention has been made in view of the situation described above, and it is an object thereof to provide a long life magnetic head with small damage due to adhesion of foreign materials as well as small abrasion.

In order to achieve the above object, the present invention is incorporated into the following configurations.

A magnetic head according to the present invention comprises a core block having a medium sliding surface formed on one surface of the core block, the medium sliding surface having a slender convex curved shape formed along a sliding direction of a recording medium from the upstream side of the sliding direction to the downstream side, and the medium sliding surface having a magnetic gap formed thereon, wherein the medium sliding surface is shaped along a longitudinal direction thereof like a circular arc with a radius of curvature R while being shaped along a width direction like a circular arc with a radius of curvature r, which is smaller than the radius of curvature R, so that the radius of curvature r is continuously reduced with closer distance to the downstream end of the recording medium sliding direction from a vicinity of the magnetic gap.

According to such a magnetic head, since the radius of curvature r of the medium sliding surface is continuously reduced with closer distance to the downstream end of the recording medium sliding direction from the vicinity of the magnetic gap, the width of the contact part of the medium sliding surface to the recording medium is gradually reduced with closer distance to the downstream end from the vicinity of the magnetic gap. Therefore, a foreign material once caught up on the medium sliding surface can be discharged therefrom, enabling the damage of the medium sliding surface to be reduced.

Also, since the radius of curvature r is set to be comparatively large in the vicinity of the magnetic gap, the medium sliding surface cannot be tapered in the vicinity of the magnetic gap, thereby reducing the abrasion due to the recording medium.

A magnetic head according to the present invention is the magnetic head described above, in which the radius of curvature r of the medium sliding surface may be continuously reduced with closer distance to the upstream end of the recording medium sliding direction from a vicinity of the magnetic gap.

According to such a magnetic head, since the radius of curvature r of the medium sliding surface is continuously reduced with closer distance to the upstream end of the recording medium sliding direction from the vicinity of the magnetic gap, the width of the contact part of the medium sliding surface to the recording medium is gradually increased with closer distance to the vicinity of the magnetic gap from the upstream end. Therefore, only the foreign material stuck on the recording medium is flicked off when it contacts on the medium sliding surface together with the recording medium, so that the foreign material cannot be caught up on the medium sliding surface, enabling the damage of the medium sliding surface to be reduced.

Also, since the radius of curvature r is set to be comparatively large in the vicinity of the magnetic gap, the abrasion due to the recording medium can be reduced in the same way as the above.

A magnetic head according to the present invention is the magnetic head described above, in which if it is defined that the radius of curvature r in the vicinity of the magnetic gap is r1; the radius of curvature r of at least one of the downstream end and the upstream end of the recording medium sliding direction is r2; and Δr=r1−r2, the Δr may range from 0.1 mm to 0.5 mm.

Also, the respective radii of curvature r (=r2) in the downstream end and the upstream end may be equal to or different from each other.

According to such a magnetic head, since the Δr is set to be in the above range, a magnetic head with small damage and abrasion due to the recording medium can be obtained.

A magnetic head according to the present invention is also the magnetic head described above, in which a cut-out is provided at a position adjacent to the downstream end of the medium sliding surface so that the width of the medium sliding surface is continuously reduced with closer distance to the downstream end.

According to such a magnetic head, since the width of the medium sliding surface at the downstream end becomes smaller by providing the cut-out at a position adjacent to the downstream end of the medium sliding surface, so that the radius of curvature r adjacent to the downstream end is more reduced, and a foreign material once caught up on the medium sliding surface is liable to be discharged therefrom, enabling the damage of the medium sliding surface to be further reduced.

A magnetic head according to the present invention is also the magnetic head described above, in which a cut-out is provided at a position adjacent to the upstream end of the medium sliding surface so that the width of the medium sliding surface is continuously reduced with closer distance to the upstream end.

According to such a magnetic head, since the width of the medium sliding surface at the upstream end becomes smaller by providing the cut-out at a position adjacent to the upstream end of the medium sliding surface, so that the radius of curvature r adjacent to the upstream end is more reduced, and a foreign material stuck to the recording medium is more liable to be flipped therefrom, enabling the damage of the medium sliding surface to be further reduced.

Next, a recording and reproducing apparatus according to the present invention comprises a tape loading route, in which a tape-like recording medium derived from a tape reel is wound about a rotary drum; and any one of the magnetic heads described above and disposed in the rotary drum.

According to such a recording and reproducing apparatus, since it is provided with the magnetic head described above with small damage due to foreign material adhesion as well as small abrasion, a low noise and long life recording/reproducing apparatus can be obtained.

The tape loading route may preferably comprise the rotary drum to be driven and rotated; guide posts respectively disposed on the upstream side and the downstream side of the rotary drum for guiding a tape-like recording medium derived from the tape reel so as to wind it around the rotary drum; and a capstan disposed on the downstream side of the rotary drum for allowing the recording medium to travel.

As described above in detail, according to a magnetic head of the present invention, a curvature radius r of a medium sliding surface is formed to continuously decrease from the vicinity of the magnetic gap toward the downstream end in a recording medium sliding direction, and a contact part of the medium sliding surface to a recording medium gradually decreases from the vicinity of the magnetic gap toward the downstream end, so that a foreign material once caught up on the medium sliding surface can be discharged therefrom by being stuck to the recording medium again, enabling the damage of the medium sliding surface to be reduced.

The radius of curvature r is also set to be comparatively large in the vicinity of the magnetic gap, so that the medium sliding surface cannot be tapered in the vicinity of the magnetic gap, thereby reducing the abrasion due to a recording medium.

BRIEF DESCRIPTION OF THE DRAWINGS

FIGS. 4A to 4D are drawings showing the magnetic head shown in FIG. 1, wherein FIG. 4A is a front view of the magnetic head, FIG. 4B is a schematic sectional view at the line IVb—IVb of FIG. 4A; FIG. 4C is a schematic sectional view at the line IVc—IVc of FIG. 4A, and FIG. 4D is a schematic sectional view at the line IVd—IVd of FIG. 4A;

DESCRIPTION OF THE PREFERRED EMBODIMENTS

Embodiments according to the present invention will be described below with reference to the drawings.

Figure 1:
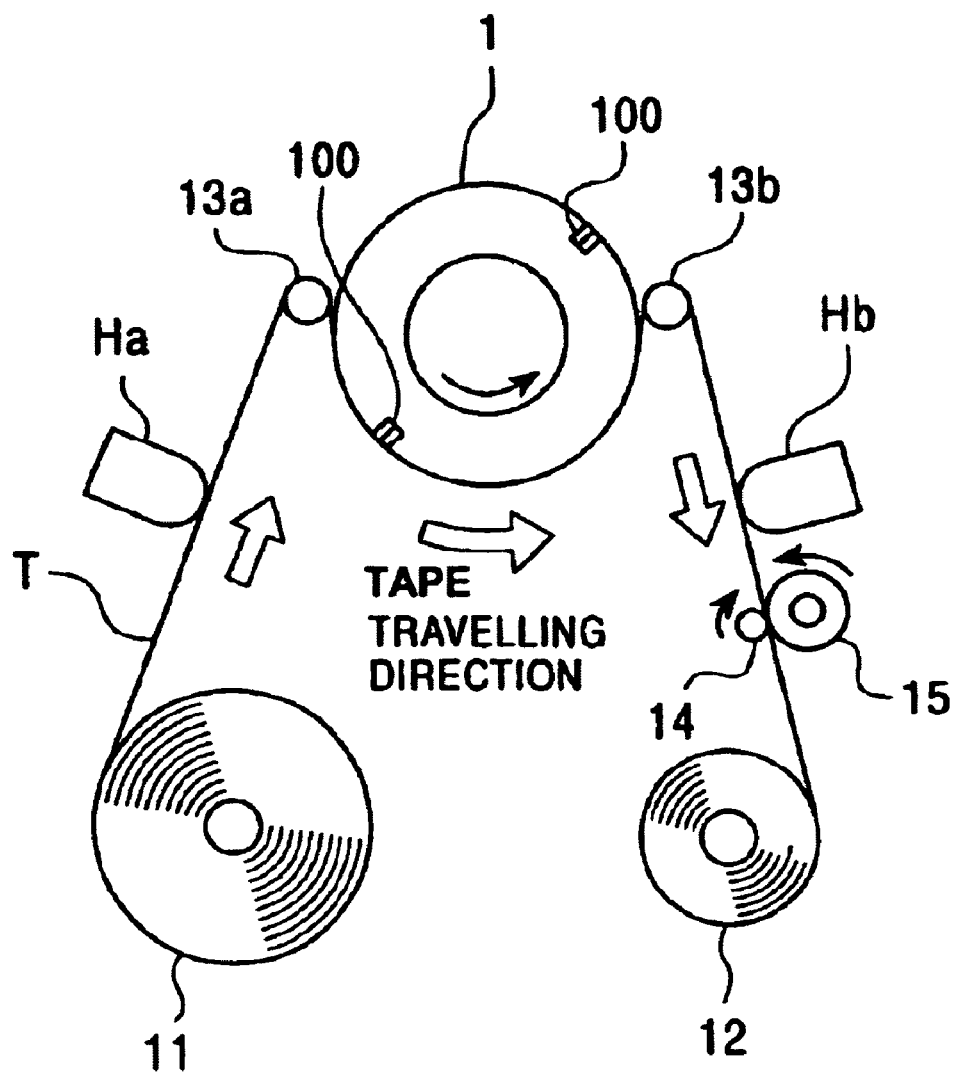
FIG. 1 is a schematic plan view of a tape loading route of a recording/reproducing apparatus according to an embodiment of present invention.

FIG. 1 is a schematic plan view of a tape-loading route of a recording/reproducing apparatus according to the embodiment of the present invention. The recording/reproducing apparatus shown in FIG. 1 and comprising a rotary drum 1 is used for instruments such as VTR equipment. The rotary drum 1 rotationally driven by a motor is equipped with two magnetic heads 100 according to the present invention. In the recording/reproducing apparatus shown in FIG. 1, a magnetic tape (a recording medium) T derived from a feeding tape reel 11 of a tape cassette and guided along a guide post 13*a* is wound about the rotary drum 1 by a predetermined angle; furthermore, the magnetic tape T guided along a guide post 13*b* is clamped between a capstan 14 and a pinch roller 15 so as to travel in the arrow direction of the drawing by the rotation of the capstan 14; finally the magnetic tape T is wound about a winding tape reel 12. In such a manner, the rotary drum 1 having the magnetic heads 100 and the magnetic tape T constitute the tape-loading route.

There are also provided an overall-width erase head Ha and a sound head Hb in the tape-loading route.

Figure 2:
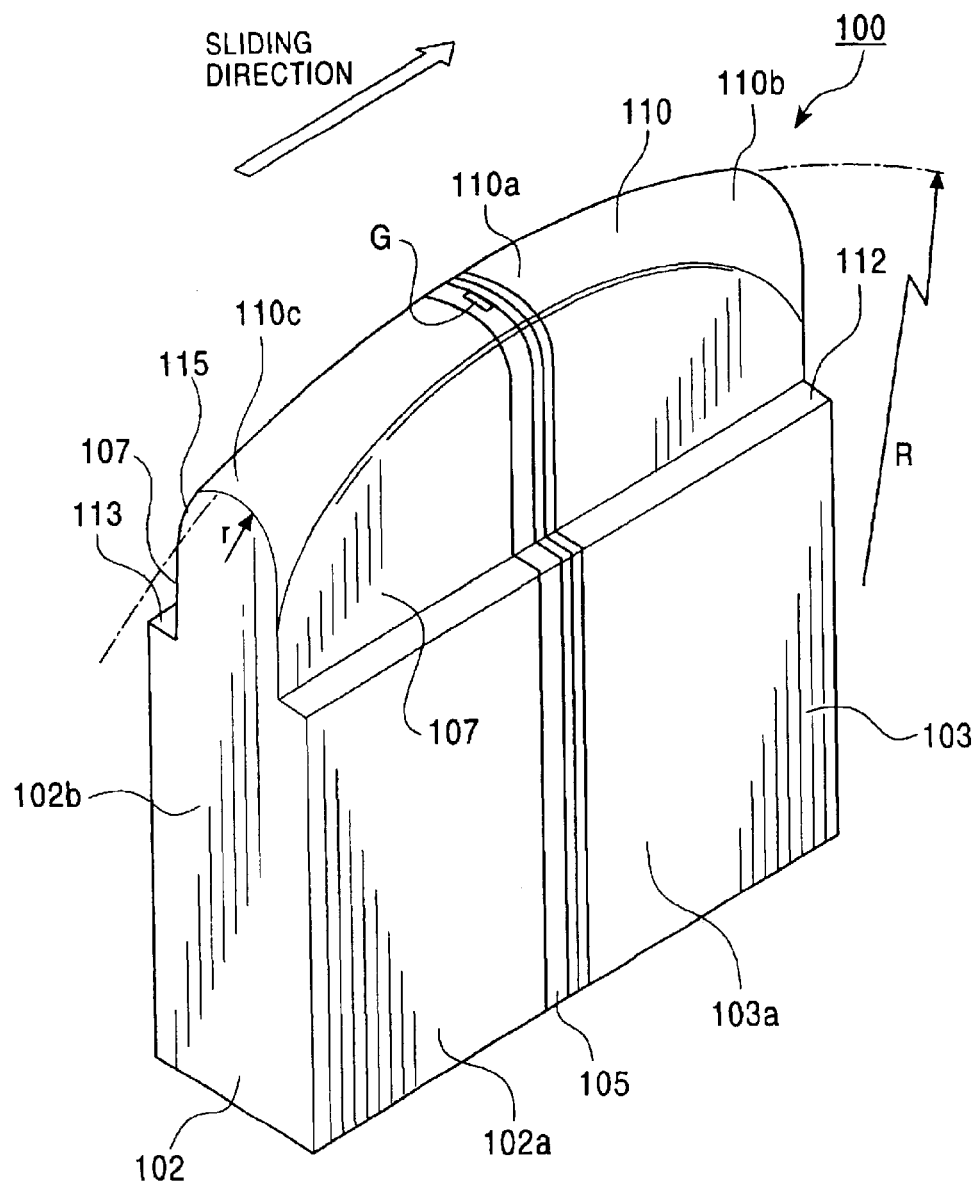
FIG. 2 is a perspective view of an example of a magnetic head according to the embodiment of the present invention.
Figure 3:
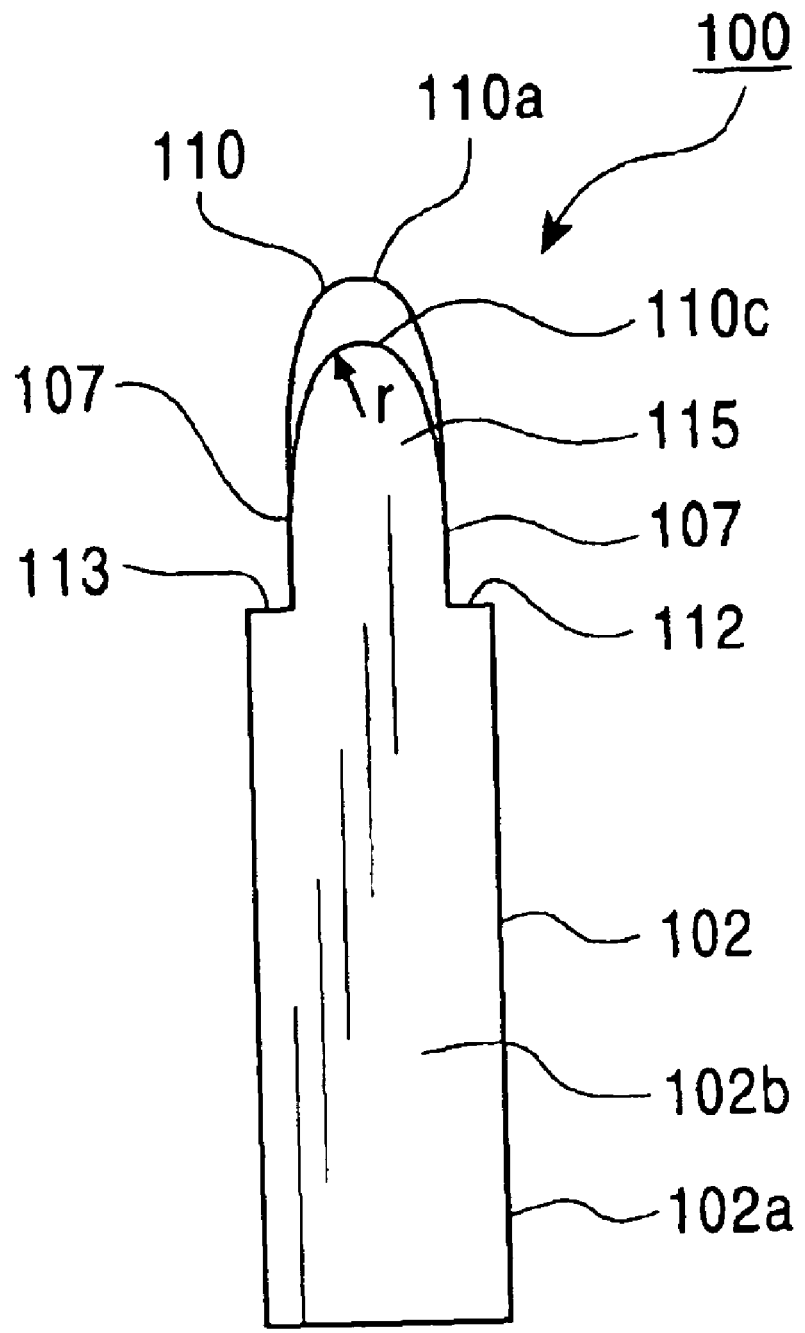
FIG. 3 is a side view of the magnetic head shown in FIG. 1.

FIG. 2 is a perspective view of the magnetic head 100; FIG. 3 is a side view of the magnetic head 100; FIGS. 4A to 4D are a front view and side views of the magnetic head 100; and FIG. 5 is a plan view of the magnetic head 100.

The magnetic head 100 shown in FIGS. 2 to 5 is built by bonding side faces of plate-like core half-pieces (core blocks) 102 and 103 together with a core-embedded layer 105 therebetween so as to have a plate-like integrated structure on the whole. The core half-pieces 102 and 103 are made of a hardwearing ceramic material such as $CaTiO_3$ and AlTiC ($Al_2O_3$—$TiO_2$ ceramic), or Ni—Zn ferrite. The core-embedded layer 105 is provided with a reproducing MR head and a recording inductive thin-film head built therein.

As shown in FIGS. 2 to 5, one surface of the magnetic heads 100 is formed like a slender convex curved surface so as to have a medium sliding surface 110, and on both sides of the medium sliding surface 110 in the width direction, steps 112 and 113 are continuously formed so as to sandwich the medium sliding surface 110. That is, in an upper portion forming the core blocks 102 and 103, a projection 115 is constructed so as to cramp the steps 112 and 113, and the top surface of the projection 115 constitutes the medium sliding surface 110 while surfaces neighboring both the side surfaces of the medium sliding surface 110 in the width direction constitute side faces 107 and 107. Also, at the substantial center of the medium sliding surface 110, a magnetic gap G of the recording inductive thin-film head mentioned above is exposed at a position corresponding to the core-embedded layer 105.

The medium sliding surface 110 is to be a curved surface (a curved surface along a sliding direction of a magnetic tape) along a circular arc with a radius of curvature R along a surface including large area side surfaces 102*a* and 103*a* of the core half-pieces 102 and 103. That is, the medium sliding surface 110 is formed like a slender convex curved surface along the sliding direction of the magnetic tape (the recording medium) from the upstream side to the downstream side, as shown by the arrow in the drawing, so as to have a circular arc with a radius of curvature R along the longitudinal direction thereof.

Also, the medium sliding surface 110 is to be a curved surface along a circular arc with a radius of curvature r existing on a side face 102*b* (a surface perpendicularly neighboring on the side surface 102*a*) of the core half-piece 102. That is, the medium sliding surface 110 is formed so as to have a circular arc with a radius of curvature r, which is smaller than the radius of curvature R, along the width direction thereof.

Furthermore, as shown in FIGS. 3 to 5, the radius of curvature r is arranged so as to continuously decrease from a vicinity 110*a* of the magnetic gap G to the downstream end 110*b* in the sliding direction of the recording medium. Similarly, the radius of curvature r is arranged so as to continuously decrease from the vicinity 110*a* of the magnetic gap G to the upstream end 110*c* in the sliding direction of the recording medium. That is, the radius of curvature of the medium sliding surface 110 is comparatively large in the vicinity 110*a* of the magnetic gap G, and the radius of curvature is reduced with further distance from the magnetic gap G.

Therefore, when the magnetic tape is sliding on the medium sliding surface 110, the width of an actual contact part is small adjacent to the upstream end 110*c* of the medium sliding surface 110; the width of the actual contact part gradually increases toward the vicinity 110*a* of the magnetic gap G; then, the width of the contact part is reduced again with closer distance to the downstream end 110*b*.

Therefore, if a foreign material is stuck to the magnetic tape T, the foreign material is once brought into contact with the medium sliding surface 110 together with the magnetic tape; however, only the foreign material is flicked off by the sliding of the magnetic tape so that the foreign material cannot be caught up on the medium sliding surface 110.

Even if the foreign material is caught up on the medium sliding surface 110, since the width of the contact part of the medium sliding surface 110 is gradually reduced with closer distance to the downstream end 110*b*, the foreign material is separated from the medium sliding surface 110 by being stuck to the magnetic tape again.

In such a manner, since opportunity of the foreign material to contact with the medium sliding surface 110 is reduced, damage due to the foreign material is reduced and the damage of the medium sliding surface 110 can be consequently prevented.

The radius of curvature r is set to be comparatively large in the vicinity 110*a* of the magnetic gap G, so that the medium sliding surface 110 cannot be tapered in the vicinity of the magnetic gap G, thereby dispersing the contact pressure of the magnetic tape and reducing the abrasion of the medium sliding surface 110.

Figure 4A:
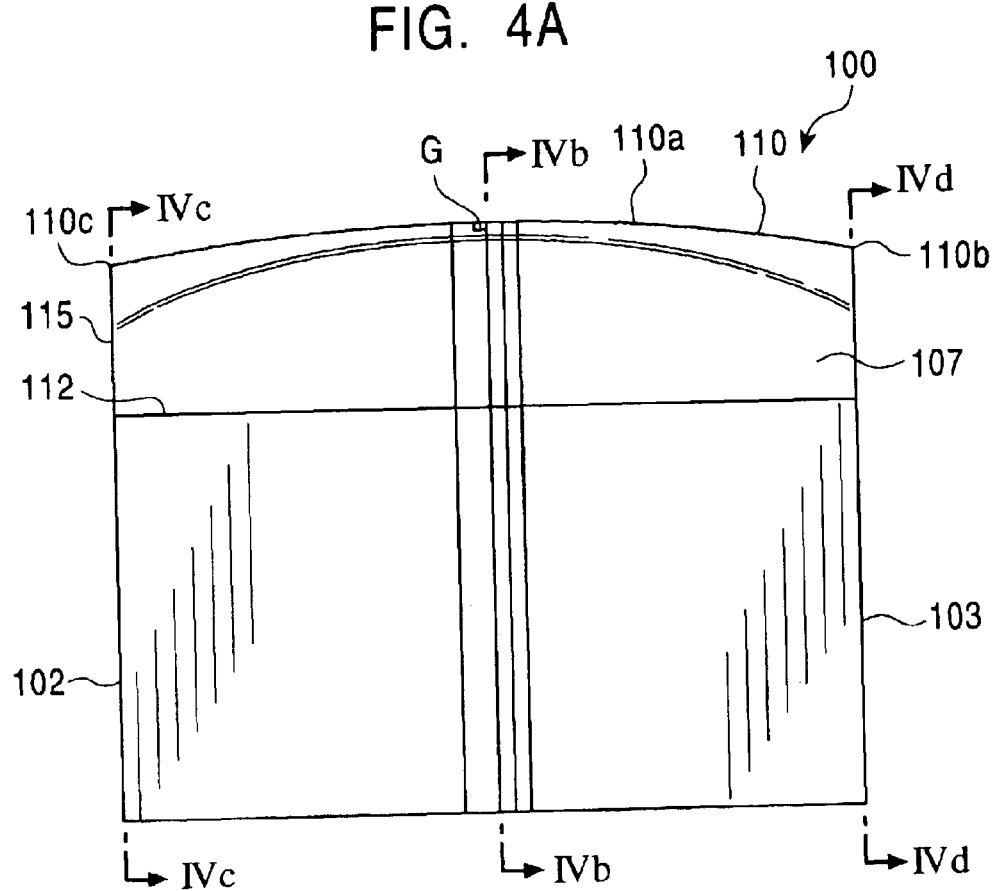
Figure 4C:
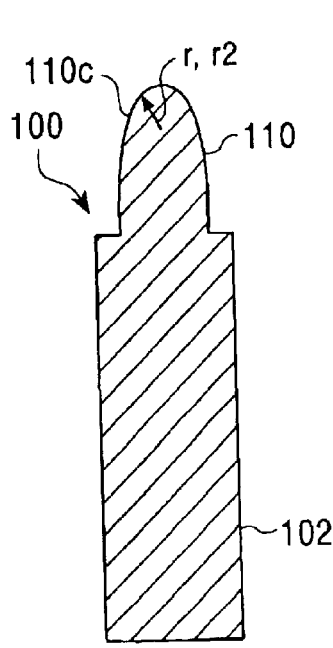
Figure 4B:
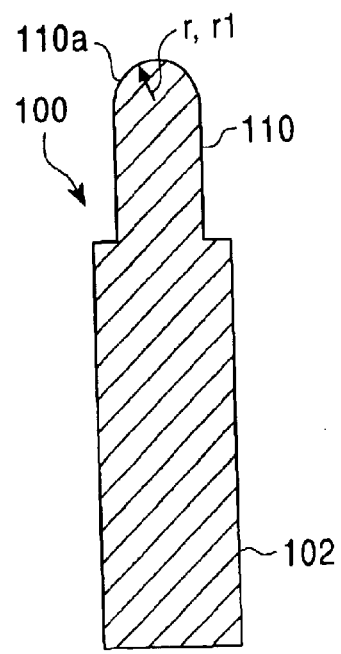
Figure 4D:
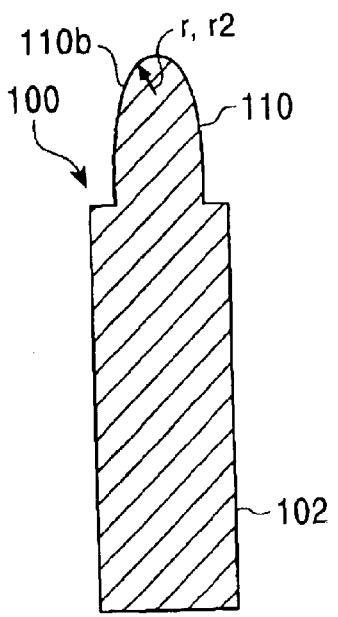
Figure 5:
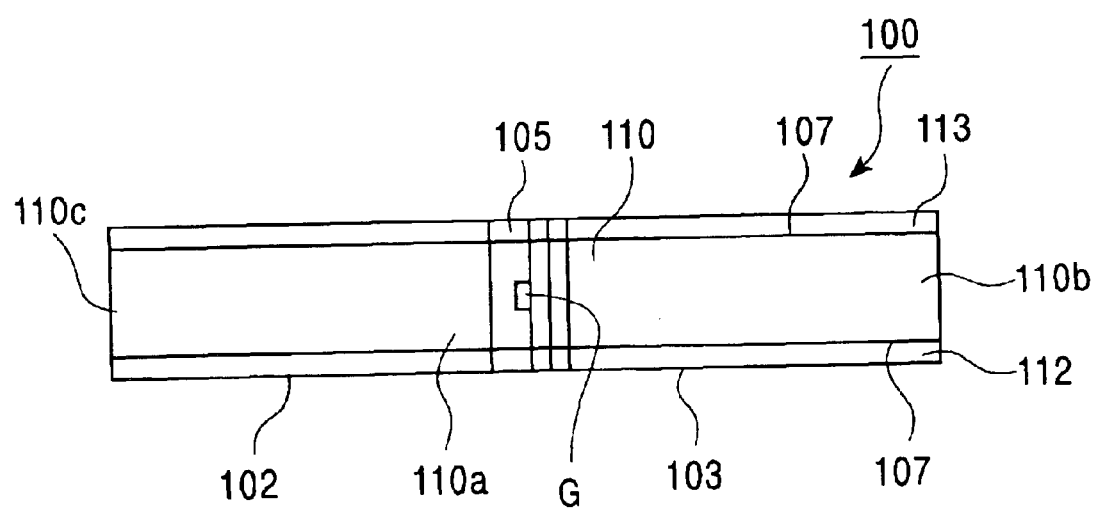
FIG. 5 is a plan view of the magnetic head shown in FIG. 1.

Regarding to the radius of curvature r, as shown in FIGS. 4B to 4D, if it is defined that the radius of curvature r in the vicinity 110*a* of the magnetic gap G is r1; the radius of curvature r of the downstream end 110*b* and/or the upstream end 110*c* in the sliding direction of the recording medium is r2; and Δr=r1−r2, it is preferable that Δr range from 0.1 mm to 0.5 mm.

The respective radii of curvature r (=r2) in the downstream end 110b and the upstream end 110c may be equal to or different from each other within the range of the condition mentioned above.

If Δr is less than 0.1 mm, the radius of curvature difference between the vicinity 110a of the magnetic gap G and the upstream end 110c/the downstream end 110b is reduced, so that the width difference of the contact part between the medium sliding surface 110 and the magnetic tape becomes smaller. Thereby, that is not preferable because the foreign material is liable to contact with the medium sliding surface 110 so that the damage cannot be prevented from being produced.

Whereas if Δr is more than 0.5, it is not preferable because the medium sliding surface 110 is tapered in shape on the whole so that the abrasion by the magnetic tape sliding is increased.

In addition, as a specific example of the radius of curvature r, it is preferable that the radius of curvature r (=r1) in the vicinity 110a of the magnetic gap G range from 0.9 mm to 1.5 mm, and 1.2 mm may be more preferable. If the radius of curvature r is 1.6 mm or more, the tape traveling is unstable.

It is preferable that the radius of curvature r (=r2) of the downstream end 110b and the upstream end 110c be 0.7 mm or more.

The specific example mentioned above may be appropriately modified by the size of the magnetic head 100 and applications not by being limited to the example.

As described above, according to the magnetic head 100, damage due to foreign materials is reduced and abrasion is also decreased.

Figure 6:
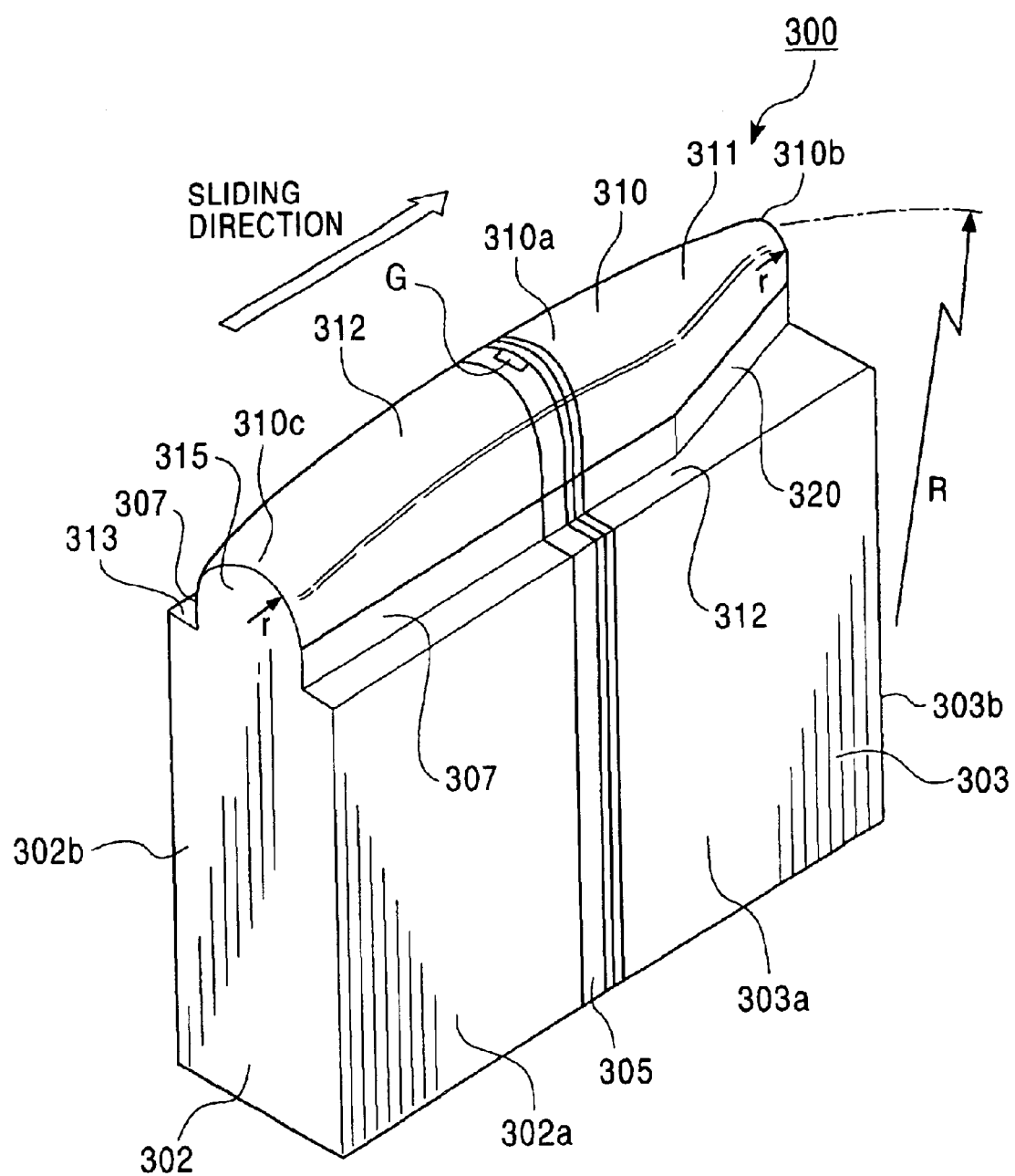
FIG. 6 is a perspective view of another example of the magnetic head according to the embodiment of the present invention.
Figure 7:
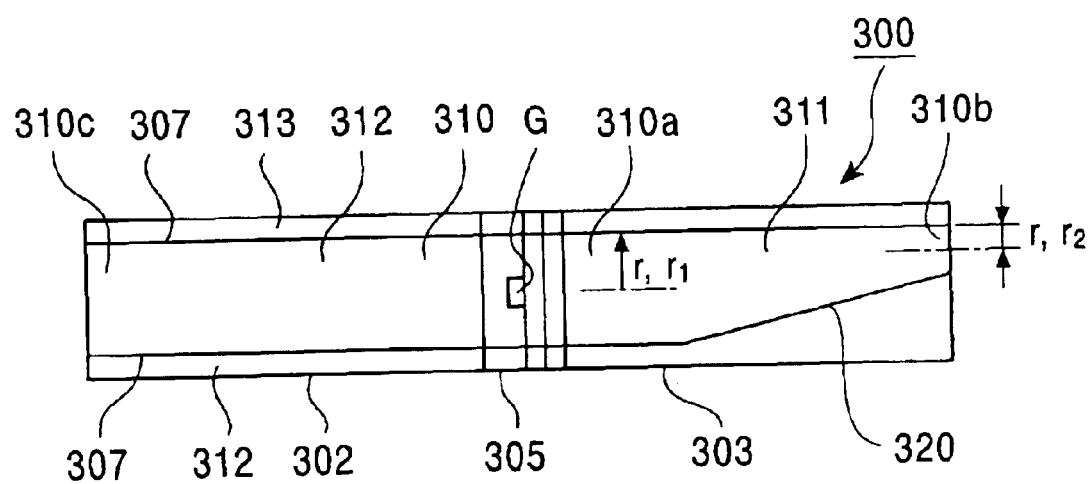
FIG. 7 is a plan view of the magnetic head shown in FIG. 6.

Next, a magnetic head 300 shown in FIGS. 6 and 7 may be used as another example of a magnetic head according to the present invention.

In a similar way to the magnetic head 100 described above, the magnetic head 300 shown in FIGS. 6 and 7 is built by bonding side faces of plate-like core half-pieces 302 and 303 together with a core-embedded layer 305 therebetween so as to have a plate-like integrated structure on the whole. The core half-pieces 302 and 303 are made of the same material as that of the core half-pieces 102 and 103. The core-embedded layer 305 also has a similar structure to that of the core-embedded layer 105.

As shown in FIGS. 6 and 7, one surface of the magnetic heads 300 is formed like a slender convex curved surface so as to have a medium sliding surface 310, and on both sides of the medium sliding surface 310 in the width direction, steps 312 and 313 are continuously formed so as to sandwich the medium sliding surface 310. A projection 315 is constructed by being cramped with the steps 312 and 313, and the top surface of the projection 315 constitutes the medium sliding surface 310 while surfaces neighboring both sides of the medium sliding surface 310 in the width direction constitute side faces 307 and 307. Also, at the substantial center of the medium sliding surface 310, the magnetic gap G is exposed at a position corresponding to the core-embedded layer 305.

The medium sliding surface 310 is formed like a slender convex curved surface along the sliding direction of the recording medium from the upstream side to the downstream side, as shown by the arrow in the drawing, so as to have a downstream-side sliding surface 311 in the downstream side of the magnetic gap G as a boundary and an upstream-side sliding surface 312 in the upstream side of the magnetic gap G as the boundary.

The downstream-side sliding surface 311 is to be a curved surface (a curved surface along a sliding direction of a magnetic tape) along a circular arc with a radius of curvature R along a surface including a side surface 303a of the core half-piece 303. That is, the downstream-side sliding surface 311 is formed like a circular arc with the radius of curvature R along the longitudinal direction thereof.

Also, the downstream-side sliding surface 311 is to be a curved surface along a circular arc with a radius of curvature r existing on a side face 303b (a surface perpendicularly neighboring on the side surface 303a) of the core half-piece 303. That is, the downstream-side sliding surface 311 is formed so as to have a circular arc with a radius of curvature r, which is smaller than the radius of curvature R, along the width direction thereof.

Furthermore, as shown in FIGS. 6 and 7, a cut-out 320 is provided on the downstream-side of the projection 315 in the sliding direction. The cut-out 320 is formed so that the width of the projection 315 (the downstream-side sliding surface 311) continuously decreases from the magnetic gap G to the downstream end 310b. Therefore, the radius of curvature r in the downstream-side sliding surface 311 is arranged so as to continuously decrease from a vicinity 310a of the magnetic gap G to the downstream end 310b in the sliding direction of the recording medium.

Since the width of the downstream-side sliding surface 311 is continuously decreased especially with the cut-out 320, the radius of curvature r at the downstream end 310b can be reduced smaller than that of the case of the magnetic head 100 described above.

Next, the upstream-side sliding surface 312 is to be a curved surface along a circular arc with a radius of curvature r existing on a side face 302b (a surface perpendicularly neighboring on the side surface 302a) of the core half-piece 302. The radius of curvature r of the upstream-side sliding surface 312 is constant from the magnetic gap G until the upstream end 310c.

In addition, the radius of curvature r of the upstream-side sliding surface 312, in the same way as in the downstream-side sliding surface 311, may be formed so as to continuously decrease to the upstream end 310c.

Therefore, when the magnetic tape is sliding on the medium sliding surface 310, the width of a contact part is substantially constant from the upstream end 310c to the vicinity 310a of the magnetic gap G, and the width of the contact part gradually decreases from the vicinity 310a toward the downstream end 310b.

Therefore, if a foreign material is stuck to the magnetic tape T, the foreign material is once brought into contact with the medium sliding surface 310 together with the magnetic tape; however, since the width of the contact part gradually decreases toward the downstream end 310b after crossing the magnetic gap G, the foreign material is again stuck to the magnetic tape so as to separate from the medium sliding surface 310.

In such a manner, since opportunity of the foreign material to contact with the medium sliding surface 310 is reduced, damage due to the foreign material is reduced and the damage of the medium sliding surface 310 can be consequently prevented.

The radius of curvature r is set to be comparatively large in between the upstream end 310c and the vicinity 310a of the magnetic gap G, so that the medium sliding surface 310 cannot be tapered in the vicinity of the magnetic gap G, thereby dispersing the contact pressure of the magnetic tape and reducing the abrasion of the medium sliding surface 310.

Regarding to the radius of curvature r, as shown in FIGS. 6 and 7, if it is defined that the radius of curvature r in the vicinity 310a of the magnetic gap G is r1; the radius of curvature r of the downstream end 310b in the sliding direction of the recording medium is r2; and Δr=r1−r2, it is preferable that Δr range from 0.1 mm to 0.5 mm.

If Δr is less than 0.1 mm, the radius of curvature difference between the vicinity 310a of the magnetic gap G and the downstream end 310b is reduced, so that that is not preferable because the foreign material is liable to remain on the medium sliding surface 310 so that the damage cannot be prevented from being produced.

Whereas if Δr is more than 0.5, it is not preferable because the medium sliding surface 310 is tapered in shape on the whole so that the abrasion by the sliding magnetic tape is increased.

In addition, a specific example of the radius of curvature r (=r1, r2) is similar to the case of the magnetic head 100 described above.

As described above, according to the magnetic head 300, damage due to foreign materials is reduced and abrasion can be also decreased.

Figure 8:
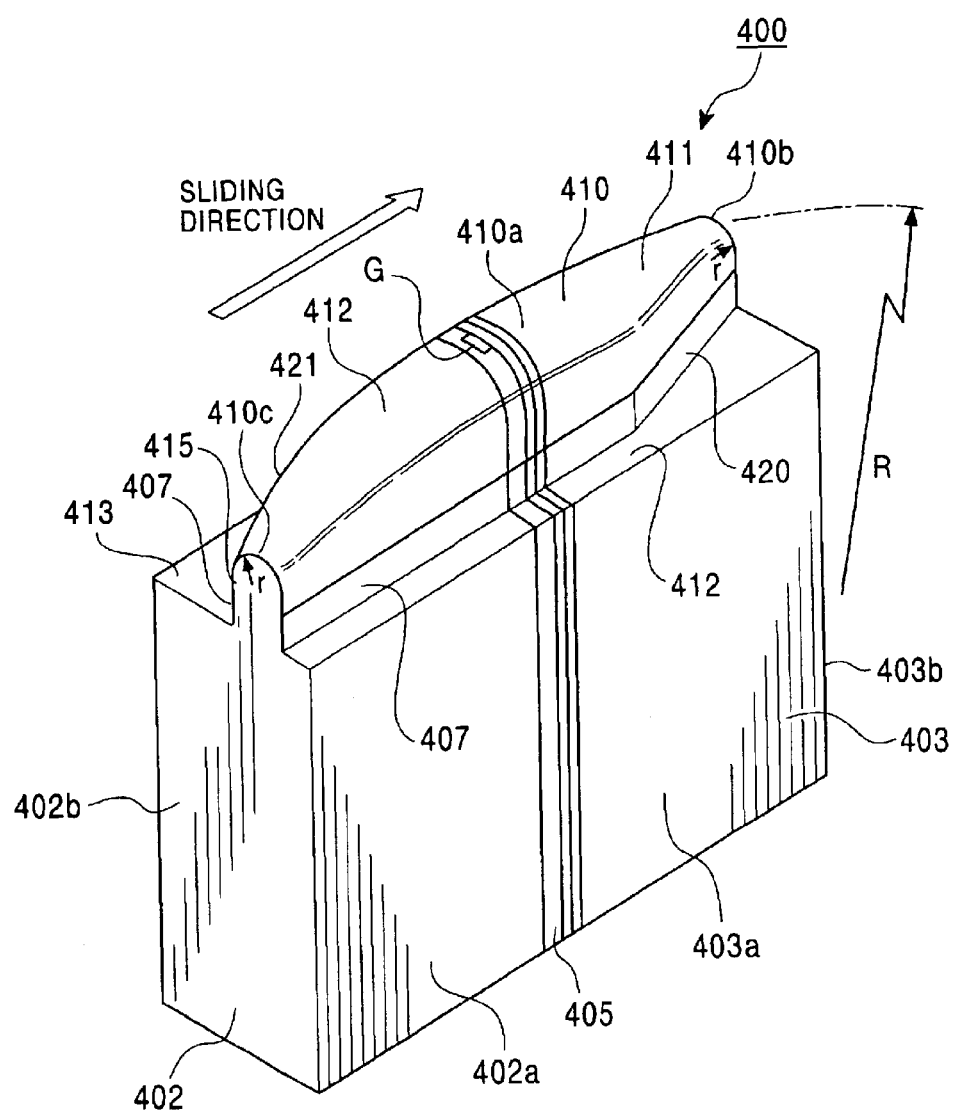
FIG. 8 is a perspective view of still another example of the magnetic head according to the embodiment of the present invention.
Figure 9:
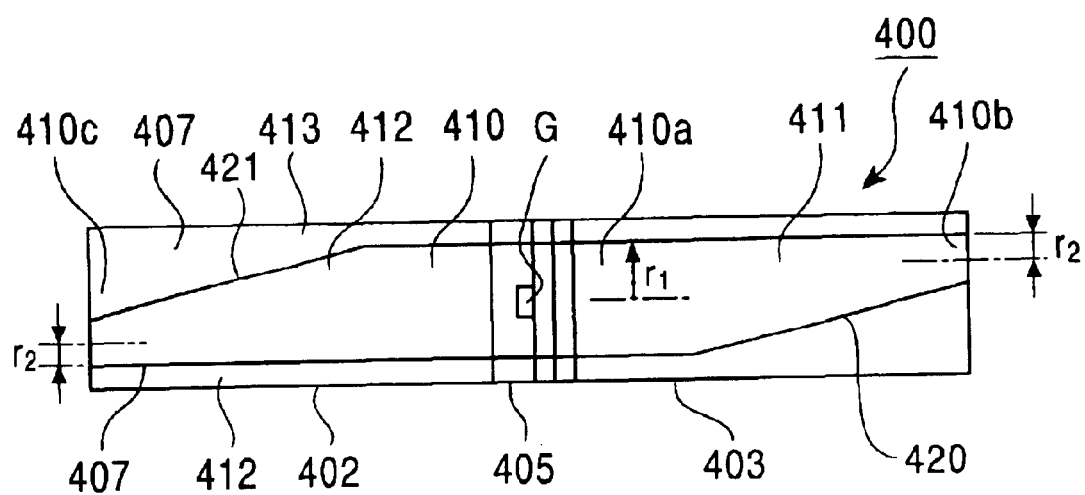
FIG. 9 is a plan view of the magnetic head shown in FIG. 8.

Next, a magnetic head 400 shown in FIGS. 8 and 9 may be used as another example of a magnetic head according to the present invention.

In a similar way to the magnetic head 100 described above, the magnetic head 400 shown in FIGS. 8 and 9 is built by bonding side faces of plate-like core half-pieces 402 and 403 together with a core-embedded layer 405 therebetween so as to have a plate-like integrated structure on the whole. The core half-pieces 402 and 403 are made of the same material as that of the core half-pieces 102 and 103. The core-embedded layer 405 also has a similar structure to that of the core-embedded layer 105.

As shown in FIGS. 8 and 9, one surface of the thin-film magnetic heads 400 is formed like a slender convex curved surface so as to have a medium sliding surface 410, and on both sides of the medium sliding surface 410 in the width direction, steps 412 and 413 are continuously formed so as to sandwich the medium sliding surface 410. A projection 415 is constructed by being cramped with the steps 412 and 413, and the top surface of the projection 415 constitutes the medium sliding surface 410 while surfaces neighboring both sides of the medium sliding surface 410 in the width direction constitute side faces 407 and 407. Also, at the substantial center of the medium sliding surface 410, the magnetic gap G is exposed at a position corresponding to the core-embedded layer 405.

The medium sliding surface 410 is formed like a slender convex curved surface along the sliding direction of the recording medium from the upstream side to the downstream side, as shown by the arrow in the drawing, so as to have a downstream-side sliding surface 411 in the downstream side of the magnetic gap G as a boundary and an upstream-side sliding surface 412 in the upstream side of the magnetic gap G as the boundary.

The downstream-side sliding surface 411 is to be a curved surface (a curved surface along a sliding direction of a magnetic tape) along a circular arc with a radius of curvature R along a surface including a side surface 403a of the core half-piece 403. That is, the downstream-side sliding surface 411 is formed like a circular arc with the radius of curvature R along the longitudinal direction thereof.

Also, the downstream-side sliding surface 411 is to be a curved surface along a circular arc with a radius of curvature r existing on a side face 403b (a surface perpendicularly neighboring on the side surface 403a) of the core half-piece 403. That is, the downstream-side sliding surface 411 is formed so as to have a circular arc with a radius of curvature r, which is smaller than the radius of curvature R, along the width direction thereof.

Furthermore, as shown in FIGS. 8 and 9, a cut-out 420 is provided on the downstream-side of the projection 415 in the sliding direction. The cut-out 420 is formed adjacent to the step 412 so that the width of the projection 415 (the downstream-side sliding surface 411) continuously decreases from the magnetic gap G to the downstream end 410b. Therefore, the radius of curvature r in the downstream-side sliding surface 411 is arranged so as to continuously decrease from a vicinity 410a of the magnetic gap G to the downstream end 410b in the sliding direction of the recording medium.

Since the width of the downstream-side sliding surface 411 is continuously decreased especially with the cut-out 420, the radius of curvature r at the downstream end 410b can be reduced smaller than that of the case of the magnetic head 100 described above.

Next, the upstream-side sliding surface 412, in substantially the same way as in the downstream-side sliding surface 411, is formed like a circular arc with the radius of curvature R along the longitudinal direction thereof.

Also, the upstream-side sliding surface 412 is to be a curved surface along a circular arc with a radius of curvature r existing on a side face 402b (a surface perpendicularly neighboring on the side surface 402a) of the core half-piece 402. That is, the upstream-side sliding surface 412 is formed so as to have a circular arc with a radius of curvature r, which is smaller than the radius of curvature R, along the width direction thereof.

Furthermore, as shown in FIGS. 8 and 9, a cut-out 421 is provided on the upstream-side of the projection 415 in the sliding direction. The cut-out 421 is formed adjacent to the step 413 so that the width of the projection 415 (the upstream-side sliding surface 412) continuously decreases from the magnetic gap G to the upstream end 410c. Therefore, the radius of curvature r in the upstream-side sliding surface 412 is arranged so as to continuously decrease from the vicinity 410a of the magnetic gap G to the upstream end 410c in the sliding direction of the recording medium.

Since the width of the upstream-side sliding surface 412 is continuously decreased especially with the cut-out 421, the radius of curvature r at the upstream end 410c can be reduced smaller than that of the case of the magnetic head 100 described above.

Therefore, when the magnetic tape is sliding on the medium sliding surface 410, the width of an actual contact part is small adjacent to the upstream end 410c of the medium sliding surface 410; the width of the actual contact part gradually increases toward the vicinity 410a of the magnetic gap G; then, the width of the contact part is reduced again with closer distance to the downstream end 410b.

Therefore, if a foreign material is stuck to the magnetic tape T, in the same way as in the magnetic head 100 described above, the foreign material is once brought into contact with the medium sliding surface 410 together with the magnetic tape; however, only the foreign material is flicked off by the sliding of the magnetic tape so that the foreign material cannot be caught up on the medium sliding surface 410.

Even if the foreign material is caught up on the medium sliding surface 410, since the width of the contact part of the medium sliding surface 410 is gradually reduced with closer distance to the downstream end 410b, the foreign material is separated from the medium sliding surface 410 by sticking to the magnetic tape again.

In such a manner, since opportunity of the foreign material to contact with the medium sliding surface 410 is reduced, damage due to the foreign material is reduced and the damage of the medium sliding surface 410 can be consequently prevented.

The radius of curvature r is set to be comparatively large in the vicinity 410a of the magnetic gap G, so that the medium sliding surface 410 cannot be tapered in the vicinity of the magnetic gap G, thereby dispersing the contact pressure of the magnetic tape and reducing the abrasion of the medium sliding surface 410.

Regarding to the radius of curvature r, as shown in FIGS. 8 and 9, if it is defined that the radius of curvature r in the vicinity 410a of the magnetic gap G is r1; the radius of curvature r of the downstream end 410b and the upstream end 410c in the sliding direction is r2; and $\Delta r = r1 - r2$, it is preferable that $\Delta r$ range from 0.1 mm to 0.5 mm.

If $\Delta r$ is less than 0.1 mm, the radius of curvature difference between the vicinity 410a of the magnetic gap G and the downstream end 410b is reduced, so that a foreign material is liable to contact with the medium sliding surface 410. Therefore, that is not preferable because the damage cannot be prevented from being produced.

Whereas if $\Delta r$ is more than 0.5, it is not preferable because the medium sliding surface 410 is tapered in shape on the whole so that the abrasion by the magnetic tape sliding is increased.

In addition, a specific example of the radius of curvature r (=r1, r2) is similar to the case of the magnetic head 100 described above.

As described above, according to the magnetic head 400, damage due to foreign materials is reduced and abrasion can be also decreased.

According to the embodiments, a magnetic head having an MR head and an inductive thin-film head has been described; however, a magnetic head according to the present invention is not limited to this, and an MIG head (a metal in gap head) may be used.

[Embodiments]

FIRST EXPERIMENTAL EXAMPLE

By using the magnetic head 100 shown in FIGS. 2 to 5, the relationship between the number of foreign materials stuck on the medium sliding surface and $\Delta r$ was examined.

Three magnetic heads were manufactured, each having the space between the side faces 107 and 107 being constant from the upstream end 110c to the downstream end 110b, and a radius of curvature r1 in the vicinity 110a of the magnetic gap G of 1.2 mm; the respective three magnetic heads having radii of curvature r2 at the upstream end 110c and at the downstream end 110b of 1.1 mm, 0.9 mm and 0.7 mm. Values $\Delta r$ of the respective magnetic heads are 0.1 mm, 0.3 mm, and 0.5 mm. Although not shown, a magnetic head with a radius of curvature r2 of 0.65 mm was also manufactured.

These magnetic heads were assembled in the tape medium recording/reproducing apparatus shown in FIG. 1, and experiments of sliding a magnetic tape were performed. After the experiments, the number of foreign materials per unit area of the medium sliding surface was counted. The results are shown in FIG. 10.

Figure 10:
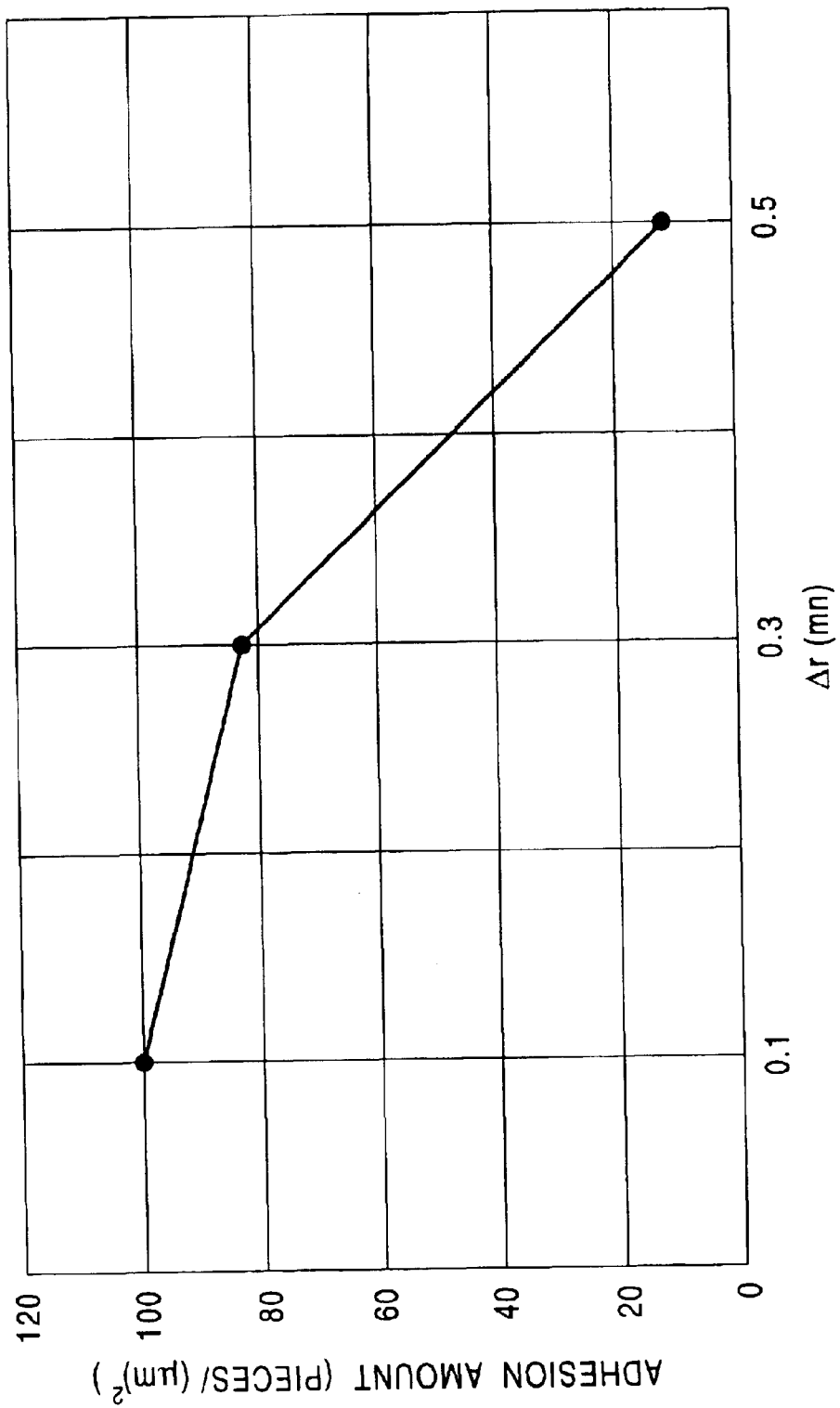
FIG. 10 is a graph showing the relationship between the adhesion amount of foreign materials and Δr.

As shown in FIG. 10, it is understood that the foreign material adhesion amount be reduced with increasing $\Delta r$. If $\Delta r$ is 0.1 mm, the foreign material adhesion amount is about 100 pieces/$(\mu m)^2$, the damage of the medium sliding surface is within the allowable limit for such an adhesion amount, so that the recording and reproducing magnetic recording information can be performed without incident.

With increasing $\Delta r$, the foreign material adhesion amount is reduced; however, if $\Delta r$ is 0.5 mm, the abrasion of the medium sliding surface is increased, further increasing the abrasion with further increasing $\Delta r$. The magnetic head especially with a radius of curvature r2 of 0.65 mm is unserviceable because of the abrasion resistance function. It is proved that a radius of curvature r2 of 0.7 mm or more be preferable.

From the above discussion, it is preferable that $\Delta r$ when the radius of curvature r1 in the vicinity of the magnetic gap is 1.2 mm range from 0.1 mm to 0.5 mm.

SECOND EXPERIMENTAL EXAMPLE

The difference of the curvature radius r of the medium sliding surface between the magnetic head with the cut-out and the magnetic head without the cut-out was examined.

First, a magnetic head as shown in FIG. 2 was prepared, which has the constant space between the side faces; a radius of curvature r1 in the vicinity of the magnetic gap G of 1.2 mm; and a radius of curvature r2 at the upstream end and at the downstream end of 1.0 mm.

Two magnetic heads were prepared, in which the cut-out is further formed adjacent to the downstream end of the above magnetic head. In these magnetic heads, the width of the medium sliding surface at the downstream end became 20 $\mu$m by forming the cut-out.

Figure 11:
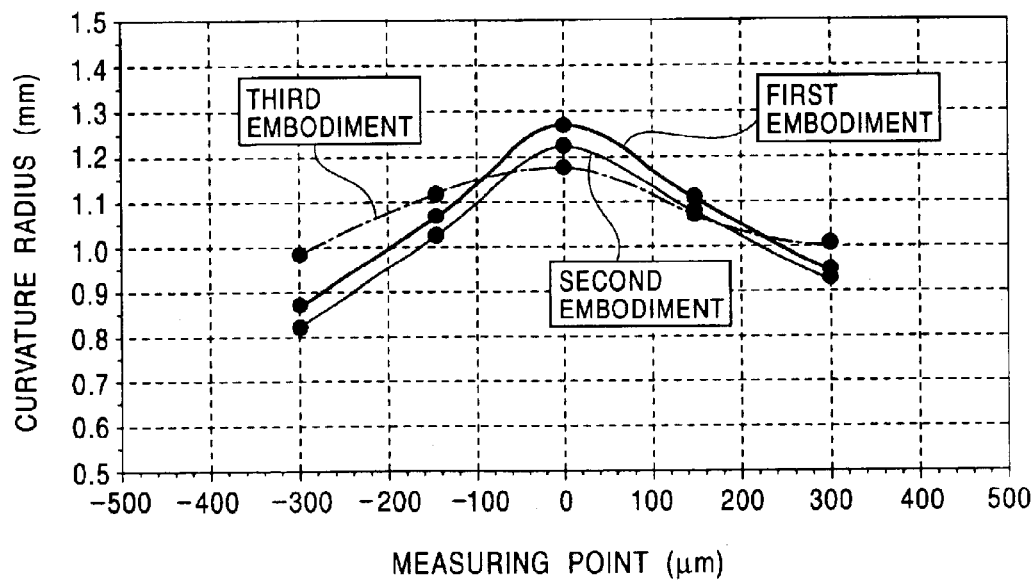
FIG. 11 is a graph illustrating the change of a curvature radius r on a medium sliding surface.

The magnetic heads with the cut-out are denoted as first and second embodiments and the magnetic head without the cut-out is denoted as a third embodiment. FIG. 11 shows the relationship between the curvature radius r and the measurement point along the longitudinal distance of the medium sliding surface for each magnetic head. In addition, on the abscissa of FIG. 11, the point 0 $\mu$m is the magnetic gap position where the curvature radius r1 is 1.2 mm in design; the point 300 $\mu$m is the upstream end of the medium sliding surface; and the point −300 $\mu$m is the downstream end of the medium sliding surface.

As shown in FIG. 11, the curvature radius of the magnetic heads according to the first and second embodiments at the position adjacent to the downstream end (the −300 $\mu$m measurement point), where the cut-out is formed, is smaller by 0.1 mm or more in comparison with that of the third embodiment.

Furthermore, two magnetic heads were manufactured, in which cut-outs are further formed at positions adjacent to the upstream end and the downstream end of the magnetic head according to the third embodiment. In these magnetic heads, the widths of the medium sliding surface at the upstream end and at the downstream end are 20 $\mu$m, respectively, by forming the cut-outs.

Figure 12:
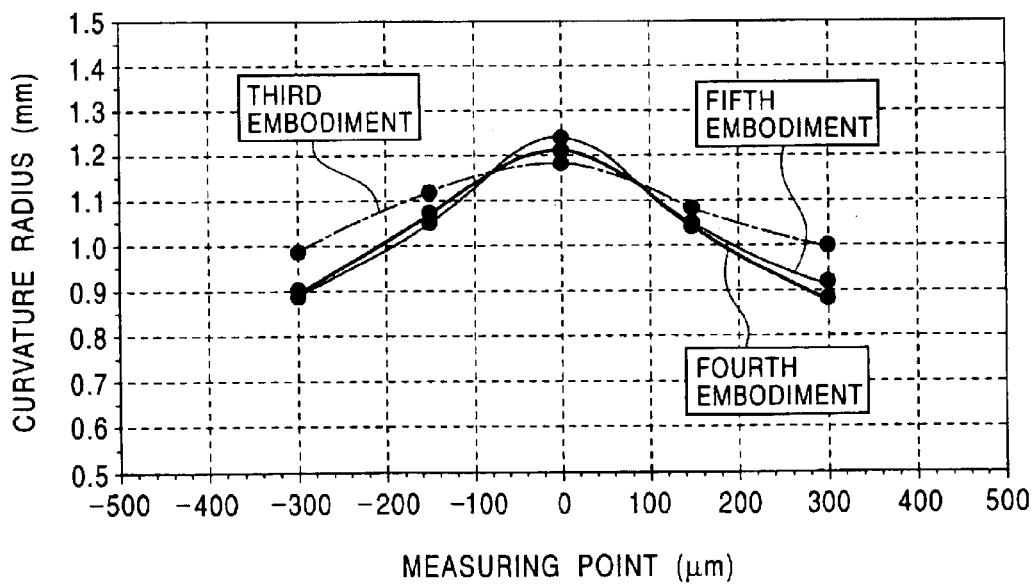
FIG. 12 is a graph illustrating the change of the curvature radius r on the medium sliding surface.
Figure 13:
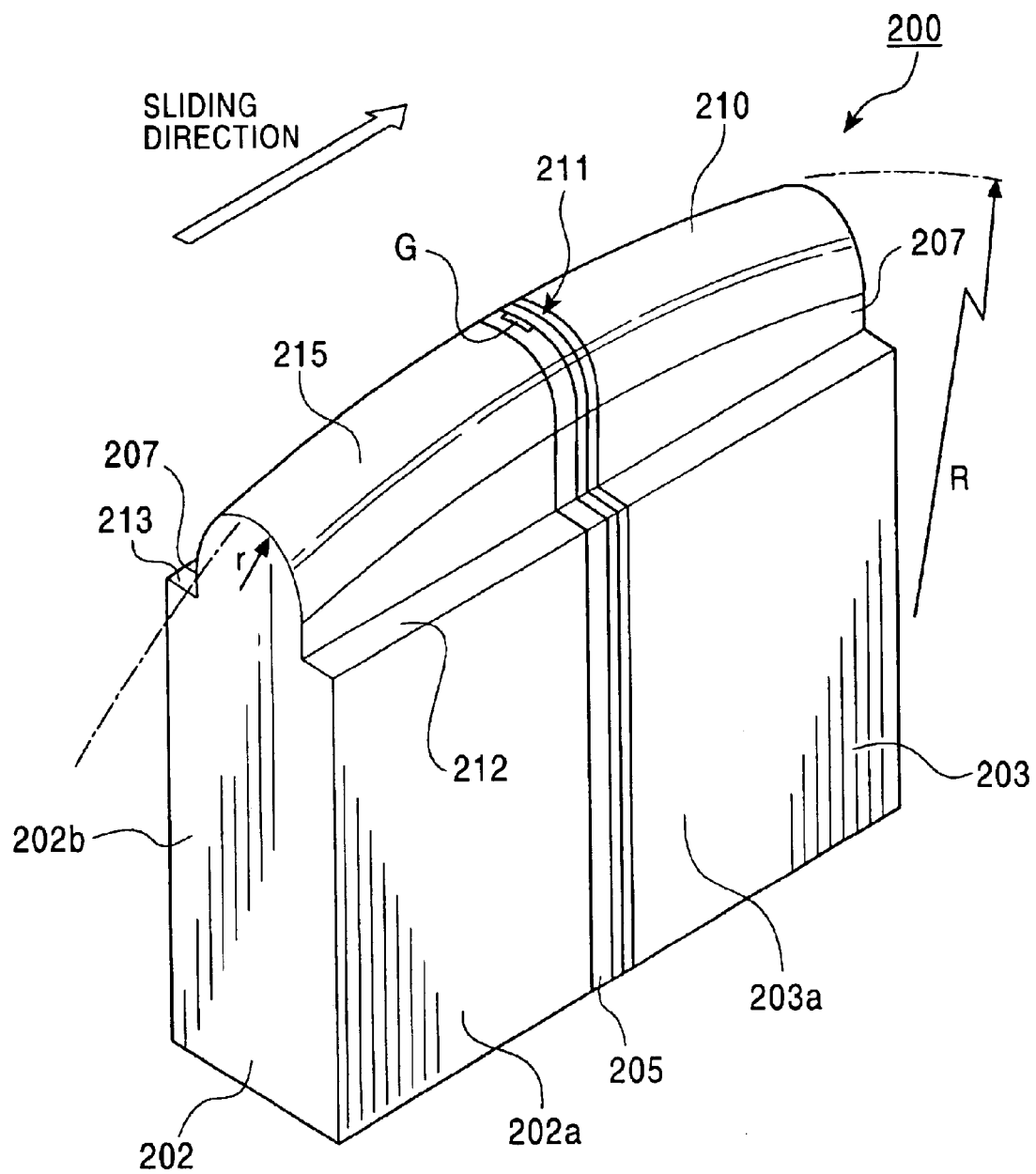
FIG. 13 is a perspective view of an example of a conventional magnetic head.

The magnetic heads manufactured in such a manner are denoted as a fourth and a fifth embodiment. FIG. 12 shows the relationship between the curvature radius r and the measurement point along the longitudinal distance of the medium sliding surface for each magnetic head. In addition, on the abscissa of FIG. 12, the point 0 $\mu$m is the magnetic gap position where the curvature radius r1 is 1.2 mm in design; the point 300 μm is the upstream end of the medium sliding surface; and the point −300 μm is the downstream end of the medium sliding surface.

As shown in FIG. 12, curvature radii of the magnetic heads according to the fourth and fifth embodiments at positions adjacent to the downstream end and the upstream end (the ±300 μm measurement points), where the cut-outs are formed, are smaller by about 0.1 mm in comparison with that of the third embodiment.

As described above, it is understood that Δr can be readily increased by providing the cut-out so as to reduce the foreign material adhesion.

As shown in FIGS. 11 and 12, it is also confirmed that in any magnetic head, the curvature radius r continuously decreases from the vicinity of the magnetic gap toward the upstream and downstream ends.

What is claimed is:

1. A magnetic head comprising a core block having a medium sliding surface formed on one surface of the core block, the medium sliding surface having a slender convex curved shape formed along a sliding direction of a recording medium from an upstream side of the sliding direction to a downstream side, and the medium sliding surface having a magnetic gap formed thereon,
    wherein the medium sliding surface is shaped along a longitudinal direction thereof like a circular arc with a radius of curvature R while being shaped along a width direction like a circular arc with a radius or curvature r, which is smaller than the radius of curvature R, so that the radius of curvature r is continuously reduced with closer distance to the downstream end of the recording medium sliding direction from a vicinity of the magnetic gap.

2. A magnetic head according to claim 1, wherein the radius of curvature r of the medium sliding surface is continuously reduced with closer distance to the upstream end of the recording medium sliding direction from a vicinity of the magnetic gap.

3. A magnetic head according to claim 2, wherein if it is defined that the radius of curvature r in the vicinity of the magnetic gap is r1; the radius of curvature r of at least one of the downstream end and the upstream end of the recording medium sliding direction is r2; and Δr=r1−r2, the Δr ranges from 0.1 mm through 0.5 mm.

4. A magnetic head according to claim 1, wherein a cut-out is provided at a position adjacent to the downstream end of the medium sliding surface so that a width of the medium sliding surface is continuously reduced with closer distance to the downstream end.

5. A magnetic head according to claim 2, wherein a cut-out is provided at a position adjacent to the downstream end of the medium sliding surface so that a width of the medium sliding surface is continuously reduced with closer distance to the downstream end.

6. A magnetic head according to claim 1, wherein a cut-out is provided at a position adjacent to the upstream end of the medium sliding surface so that a width of the medium sliding surface is continuously reduced with closer distance to the upstream end.

7. A magnetic head according to claim 2, wherein a cut-out is provided at a position adjacent to the upstream end of the medium sliding surface so that a width of the medium sliding surface is continuously reduced with closer distance to the upstream end.

8. A magnetic head according to claim 5, wherein a cut-out is provided at a position adjacent to the upstream end of the medium sliding surface so that the width of the medium sliding surface is continuously reduced with closer distance to the upstream end.

9. A recording and reproducing apparatus comprising:
    a tape loading route, in which a tape-like recording medium derived from a tape reel is wound about a rotary drum; and
    a magnetic head according to claim 1 disposed in the rotary drum.

10. An apparatus according to claim 9, wherein the tape loading route comprises:
    the rotary drum to be driven and rotated;
    guide posts respectively disposed on an upstream side and a downstream side of the rotary drum for guiding the tape-like recording medium derived from the tape reel so as to wind the tape-like recording medium around the rotary drum; and
    a capstan disposed on the downstream side of the rotary drum for allowing the recording medium to travel.

11. A recording and reproducing apparatus comprising:
    a tape loading route, in which a tape-like recording medium derived from a tape reel is wound about a rotary drum; and
    a magnetic head according to claim 2 disposed in the rotary drum.

12. An apparatus according to claim 11, wherein the tape loading route comprises:
    the rotary drum to be driven and rotated;
    guide posts respectively disposed on an upstream side and a downstream side of the rotary drum for guiding the tape-like recording medium derived from the tape reel so as to wind the tape-like recording medium around the rotary drum; and
    a capstan disposed on the downstream side of the rotary drum for allowing the recording medium to travel.

* * * * *